United States Patent
Laisement et al.

(10) Patent No.: US 6,932,387 B2
(45) Date of Patent: Aug. 23, 2005

(54) ENERGY ABSORBING SYSTEM FOR A VEHICLE STEERING COLUMN

(75) Inventors: André Laisement, La Chapelle Enchérie (FR); Alain Carrer, Thoré la Rochette (FR); Jean-Marc Gatti, Vendôme (FR)

(73) Assignee: NACAM France SA, Vendome (FR)

( * ) Notice: Subject to any disclaimer, the term of this patent is extended or adjusted under 35 U.S.C. 154(b) by 107 days.

(21) Appl. No.: 10/361,572

(22) Filed: Feb. 11, 2003

(65) Prior Publication Data

US 2003/0155760 A1 Aug. 21, 2003

(30) Foreign Application Priority Data

Feb. 15, 2002 (FR) .............................. 02 01966

(51) Int. Cl.[7] ................................ B62D 1/19
(52) U.S. Cl. ................ 280/777; 74/492; 248/900
(58) Field of Search ............................ 280/777, 779; 74/492; 248/900, 548

(56) References Cited

U.S. PATENT DOCUMENTS

| | | | | |
|---|---|---|---|---|
| 4,943,028 A | * | 7/1990 | Hoffmann et al. | 280/777 |
| 5,788,279 A | * | 8/1998 | Pfannebecker | 280/777 |
| 6,224,104 B1 | * | 5/2001 | Hibino | 280/777 |
| 6,530,600 B1 | * | 3/2003 | Marxer et al. | 280/777 |
| 6,578,872 B2 | * | 6/2003 | Duval et al. | 280/777 |

FOREIGN PATENT DOCUMENTS

EP 1176082 A1 1/2002

* cited by examiner

*Primary Examiner*—Peter C. English
(74) *Attorney, Agent, or Firm*—Lawrence E. Laubscher, Sr.; Lawrence E. Laubscher, Jr.

(57) ABSTRACT

A device is disclosed for adjusting an energy absorbing system of an automobile vehicle steering column mounted in a support assembly which is connected to and attached to the structure of the vehicle by fixing devices each having a respective fixing axis. At least one fixing device includes at least one energy absorbing capsule disposed in the support assembly on a retaining axis and clamped in the support assembly by fastening devices. The fixing axis and the retaining axis coincide. The fastening devices are independent of the fixing devices and include a nut and a rod shoulder in order to allow adjustment to achieve the required clamping of the fastening devices to obtain the required energy absorption. Adjustment of the clamping of the energy absorbing capsule or capsules is therefore independent of the clamping of the devices for fixing the support assembly to the vehicle structure.

14 Claims, 4 Drawing Sheets

ENERGY ABSORBING SYSTEM FOR A VEHICLE STEERING COLUMN

BACKGROUND OF THE INVENTION

1. Field of the Invention

The present invention relates to a device for adjusting an energy absorbing system of an automobile vehicle steering column. The steering column is mounted in a support assembly which is connected and fastened to the structure of the vehicle by fixing means, with at least one energy absorbing capsule disposed on one of the fixing means.

2. Description of the Prior Art

There are steering columns which have one or more energy absorbing capsules mounted directly on the fixing axis or axes. The energy absorption of each capsule therefore depends on clamping the support assembly to the structure of the vehicle.

In mass production, as in the automobile industry, it is difficult to achieve and to guarantee precise and constant fixing tightness and therefore a precise and constant clamping pressure on the energy absorbing capsule or capsules. As the energy absorption of these capsules depends directly on the clamping, this results in imprecise absorption of energy. In existing and future automobile vehicles, however, it is increasingly imperative for passive safety characteristics to be accurate and effective.

OBJECT OF THE INVENTION

The object of the present invention is to provide a device for adjusting an energy absorbing system that avoids the drawbacks described hereinabove and that provides for easy and precise adjustment of the required value of the energy absorption.

SUMMARY OF THE INVENTION

According to an embodiment, the device for adjusting an energy absorbing system relates to an automobile vehicle steering column. The steering column is mounted in a support assembly which is connected to and attached to the structure of the vehicle by plural fixing means each having a respective fixing axis. In this embodiment, at least one of said fixing means includes at least one energy absorbing capsule which is disposed in the support assembly on a retaining axis. Said at least one energy absorbing capsule is clamped in the support assembly by fastening means, the fixing axis and the retaining axis coinciding. Said fastening means are independent of the respective fixing means in order to allow adjustment to achieve the required clamping of the fastening means to obtain the required energy absorption, i.e. adjustment of the clamping of said at least one energy absorbing capsule is independent of a clamping value of the fixing means of the support assembly to the vehicle structure.

Advantageously, at least one of the fixing means includes two energy absorbing capsules.

According to the invention, the fastening means include a retaining rod provided at one end with a shoulder and at its other end with a threaded portion which receives a nut adapted to clamp the energy absorbing capsule or capsules to the support assembly with the required force. The energy absorbing capsule or capsules are provided with a hole through which the retaining rod passes so it can be mounted on the retaining rod between the shoulder and the nut. The retaining rod has a hole through it for the corresponding means for fixing the support assembly to the vehicle structure.

According to an embodiment particularly interesting of the invention, the retaining rod has a circular section whose diameter is slightly less than the diameter of the hole through the energy absorbing capsule or capsules, which are therefore centered on the retaining rod. The shoulder has a circular ring section whose outside diameter is substantially equal to the outside diameter of the circular periphery of the energy absorbing capsule or capsules and whose inside diameter is substantially equal to the diameter of the hole through the capsule or capsules. The retaining rod has at one end a fine pitch thread which receives a nut whose overall size is substantially equal to the overall size of the shoulder so as to have the same surface area of contact with said at least one energy absorbing capsule and one of said nut or said shoulder, or with the two capsules.

Moreover according to the invention, the retaining rod is extended at the same end as the shoulder by a handling portion with at least one handling hole substantially perpendicular to the retaining axis, i.e. the fixing axis; the periphery of the handling portion is a circular cylindrical bearing surface which guides a corresponding energy absorbing winding.

Lastly in order to improve the manufacture cost, the retaining rod, the shoulder and the handling portion constitute one and the same mechanical part.

To facilitate the fitting of the energy absorbing capsule or capsules, each energy absorbing capsule has an axial protuberance penetrating a corresponding hole in the support assembly to prevent metallic contact between fixed parts and mobile parts in the event of an impact.

The adjustment device according to the invention has at least one fixing means including two energy absorbing capsules each disposed against the corresponding face of the support assembly.

According to an architecture of the invention, the steering column comprises a steering shaft rotably mounted about a steering axis in a body tube. The body tube is disposed between two uprights connected by a connecting member. The two uprights and the connecting member form part of the support assembly. The two uprights are substantially parallel to the vertical plane passing through the steering axis. Each upright has an external flange substantially perpendicular to said upright. In each of the external flanges, there is an oblong hole whose cross section axis is the clamping axis of the corresponding energy absorbing capsules, i.e. the fixing axis, the oblong hole having a shape which is elongate parallel to the upright in order to allow the required movement of the mobile support member in the event of an impact.

Moreover, each of the two oblong holes is open at the same end as the steering wheel.

According to a variant of embodiment of the invention, the two external flanges are parts of a common base which is welded to the connecting member and to each of the two uprights and the support assembly fixing means are fixing bolts.

Lastly according to an architecture of the invention, and for each of the two fixing axes, the fixing means, the energy absorbing capsule or capsules and the fastening means are identical.

The device in accordance with the invention for adjusting an energy absorbing system of a steering column therefore has the advantage of allowing the mobile support member to slide in the fixed support member with a controlled force. The capsule fixing system is adjustable in the factory and is independent of the mounting on the vehicle.

The two capsules disposed on each side of the U-shaped lug of the mobile support member have a rod passed through them with a shoulder whose outside diameter is substantially equal to the outside diameter of the capsules and whose inside diameter is substantially equal to the inside diameter of the capsules.

The endless thread for adjusting the clamping of the nut as a function of the required sliding force is formed in alignment with the outside diameter serving to center the capsules.

Choosing the dimensions of each of the rods enables the steering column to be fixed to the vehicle by fixing bolts passing through the rods without affecting the previously set sliding force of the U-shaped lug.

BRIEF DESCRIPTION OF THE DRAWINGS

Further features and advantages of the invention will be apparent from the following particular description of a preferred embodiment of the invention shown in the corresponding accompanying drawings, in which.

DESCRIPTION OF THE PREFERRED EMBODIMENT

Figure 1:
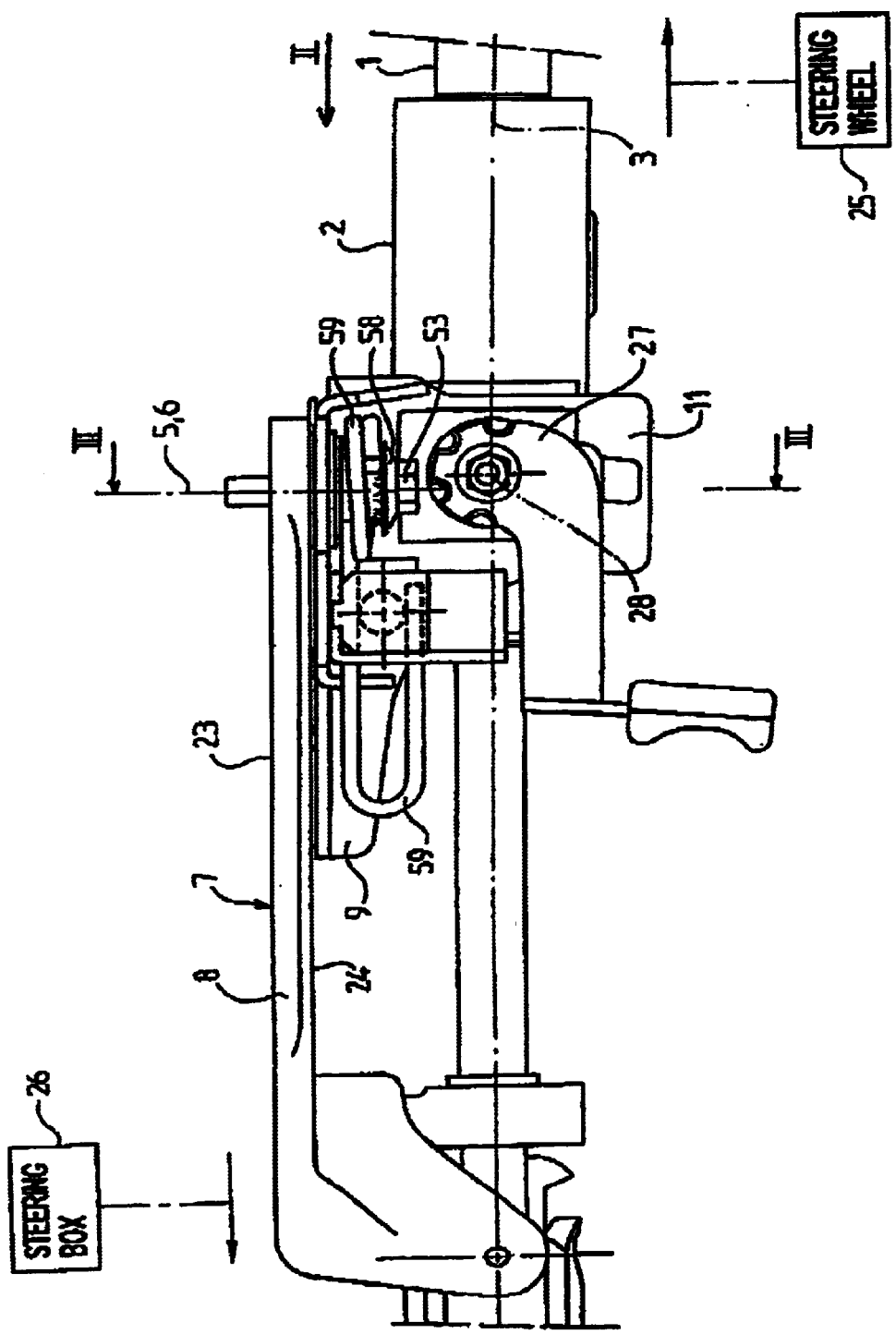
FIG. 1 is a longitudinal view along the axis of an automobile vehicle steering column to which is fitted a device in accordance with the invention for adjusting an energy absorbing system.
Figure 2:
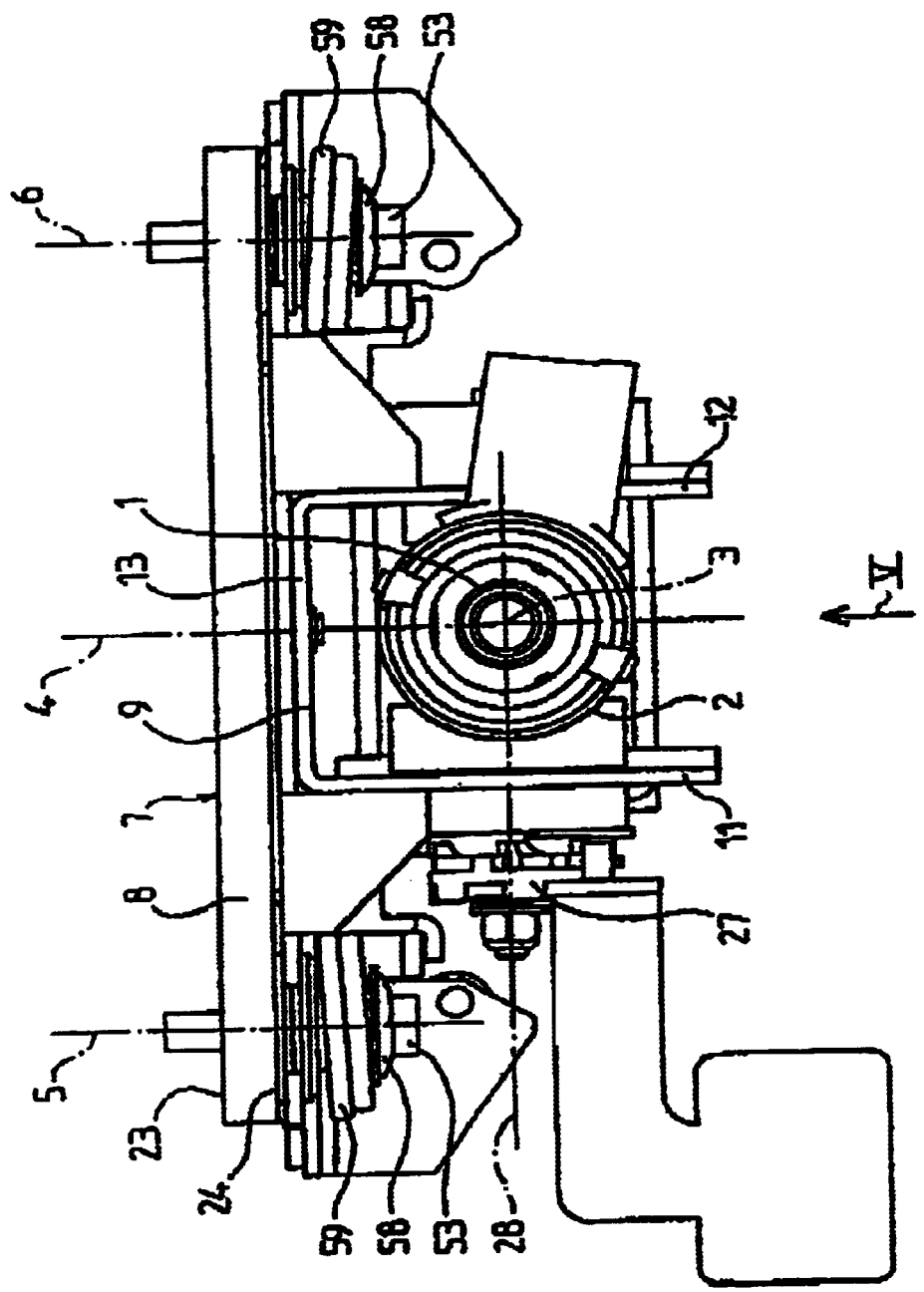
FIG. 2 is a transverse view in the direction of the arrow II in FIG. 1.

The device in accordance with the invention for adjusting an energy absorbing system relates more particularly to an automobile vehicle steering column, one embodiment of which is shown in FIGS. 1 and 2.

In all embodiments of the invention the steering column is always made up of a steering shaft 1 which turns about a steering axis 3. This steering shaft is rotably mounted in a body tube 2. A vertical plane passing through the steering axis is denoted 4.

The body tube is disposed in a support assembly 7 which is fixed to the structure 10 of the vehicle. The support assembly 7 comprises two members: A fixed support member 8 and a mobile support member 9. The fixed support member 8 and the mobile support member 9 are connected to the vehicle structure or chassis 10 and remain fixed relative to the structure 10 in normal use of the vehicle. It is only in the event of an impact that the mobile support assembly 9 is moved relative to the fixed support assembly 8 via the energy absorbing system.

In the remainder of the description, and for the same member, terms such as "internal" or "interior" in relation to the steering axis 3 or the vertical plane 4 containing the steering axis 3 mean nearer that axis or that plane, and terms such as "external" or "exterior" mean farther away from it. For the same member, terms such as "front" mean nearer the steering box 26, and terms such as "rear" mean nearer the steering wheel 25.

In another embodiment of the invention, not shown in the figures, the support assembly comprises only the mobile support member, which is fixed directly to the structure of the vehicle.

The body tube 2 is disposed between two uprights 11 and 12 which are joined by a connecting member 13. The two uprights 11, 12 and the connecting member 13 are parts of the mobile support member 9.

Figure 5:
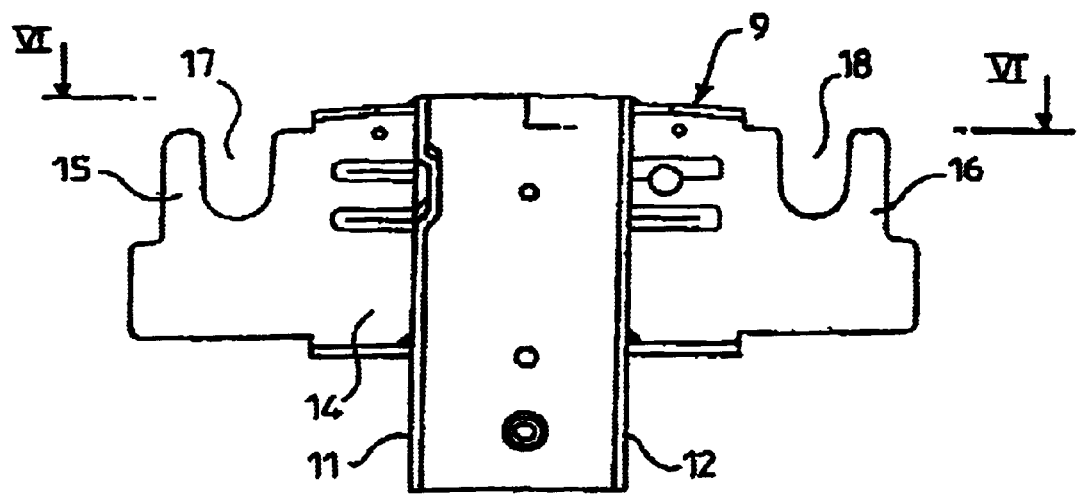
FIG. 5 is a bottom view in the direction of the arrow V of the mobile support assembly shown in FIG. 2.
Figure 6:
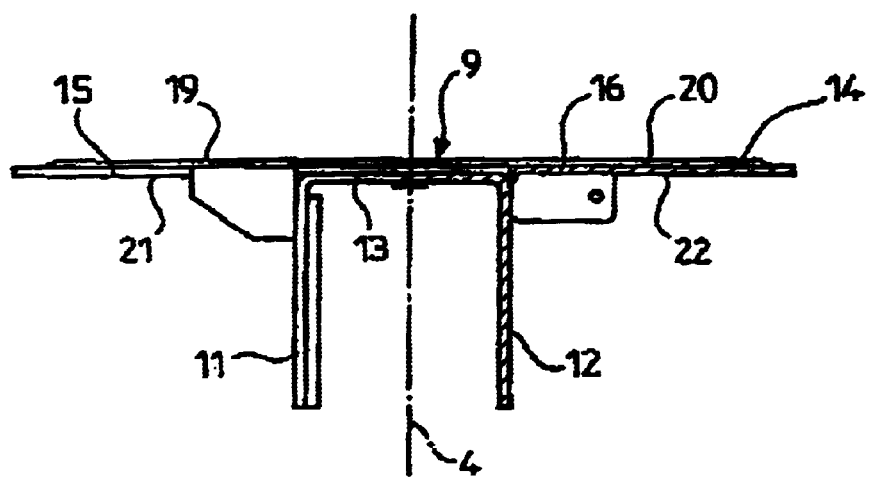
FIG. 6 is a view in section taken along the line VI—VI in FIG. 5.

The two uprights 11, 12 are substantially parallel to the vertical plane 4 passing through the steering axis 3, and the connecting member 13 is substantially perpendicular to said vertical plane 4. Each upright 11, 12 (FIGS. 5 and 6) has a respective external flange 15 and 16 that is substantially perpendicular to the corresponding upright 11, 12 and to the vertical plane 4.

In each of the external flanges 15 and 16 there is an oblong hole or slot 17, 18 whose shape is elongate parallel to the vertical plane 4, i.e., to the corresponding upright 11, 12. Each of the two oblong slots 17 and 18 is open at the same end as the steering wheel 25.

The two external flanges 15 and 16 are part of a common base 14. The base 14 is welded to the connecting member 13 and to each of the two uprights 11 and 12.

In the case of a steering column whose position can be adjusted, as shown in FIGS. 1 and 2, the body tube 2 is clamped and immobilized in the chosen position by a clamping system 27 whose clamping axis 28 is substantially perpendicular to the vertical plane 4.

The support assembly 7 is connected and attached to the structure of the vehicle 10 by plural fixing means each having a respective fixing axis. In the figures there are two fixing means in the form of fixing bolts 53 each of which has a respective fixing axis 5, 6.

According to the invention, at least one of the fixing means includes at least one annular energy absorbing capsule 31, 32. (FIGS. 3 and 4) which is disposed in said support assembly 7, along its retaining axis, and which is clamped in said support assembly 7 by fastening means.

For each of the two fixing means, consisting of the corresponding fixing bolt 53 with the corresponding fixing axis 5, 6, the fastening means include a retaining rod 41. Each retaining rod 41 has a first end portion 44, an intermediate portion 49 provided with an annular shoulder 42, and a second end portion 50 having an externally threaded portion 43, which receives a nut 51 in order to clamp the two energy absorbing capsules 31, 32 to the support assembly 7 with the required value. Each of the energy absorbing capsules 31, 32 has a hole 39, 40 through which the retaining rod 41 passes so that the capsule can be mounted on said retaining rod 41 between the shoulder 42 and the adjacent lower surface 52 of the nut 51. Said retaining rod 41 has a bore or hole 46 through which the corresponding fixing bolt 53 of the support assembly 7 on the structure of the vehicle 10 passes.

The retaining rod 41 has a circular section whose diameter is slightly less than the diameter of the holes 39 and 40 through the two energy absorbing capsules 31 and 32 which are thus centered on said retaining rod 41. The shoulder 42 has a circular ring section whose outside diameter is substantially equal to the outside diameter of the circular periphery of the energy absorbing capsules 31 and 32 and whose inside diameter is substantially equal to the diameter of the holes 39 and 40 through said capsules 31 and 32. The retaining rod 41 has one end 50 with a fine pitch thread 43 which receives the nut 51 whose overall size is substantially equal to the overall size of the shoulder 42, so as to have the same surface area of contact with each of the two capsules 31 and 32, or when there is only one capsule, with said capsule 31 and the nut 51, or with said capsule 32 and the shoulder 42.

The retaining rod 41 is extended on the same side as the shoulder 42 by the first end portion 44 that defines a handling portion with a handling hole 45 substantially perpendicular to the retaining axis, i.e. to the fixing axis 5 or 6.

The retaining rod 41, the shoulder 42 and the handling portion 44 constitute one and the same mechanical part.

Each energy absorbing capsule 31, 32 has a corresponding axial protuberance 37, 38 which enters a corresponding oblong slot or hole 17, 18 in the support assembly 7.

Figure 3:
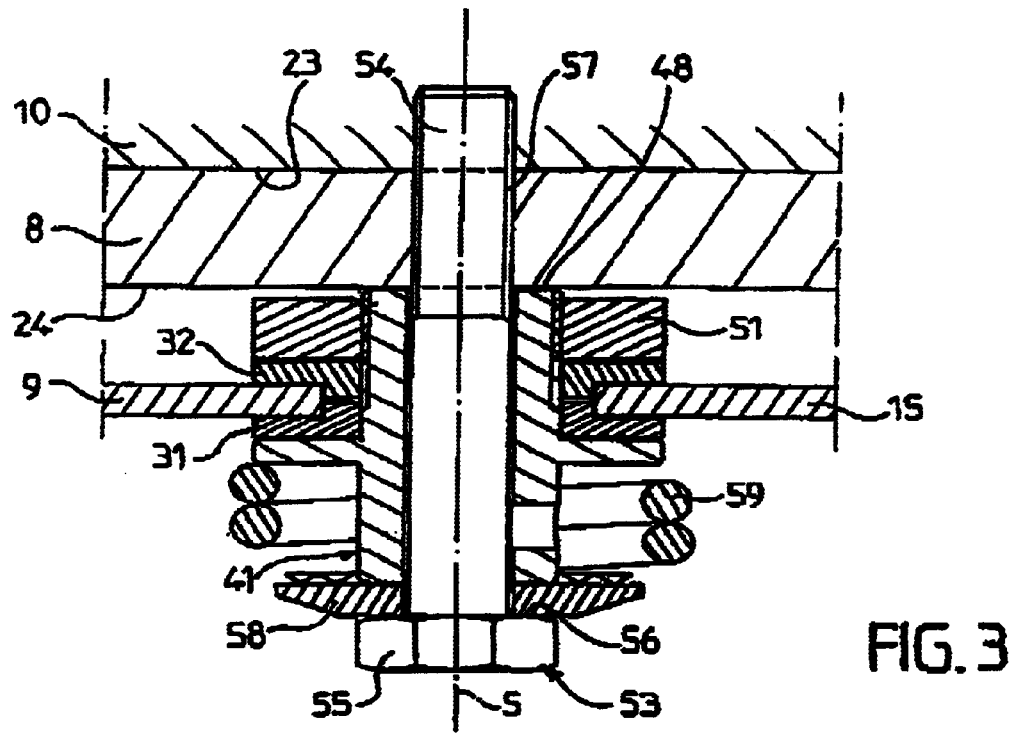
FIG. 3 is a partial view in section taken along the line III—III in FIG. 1.
Figure 4:
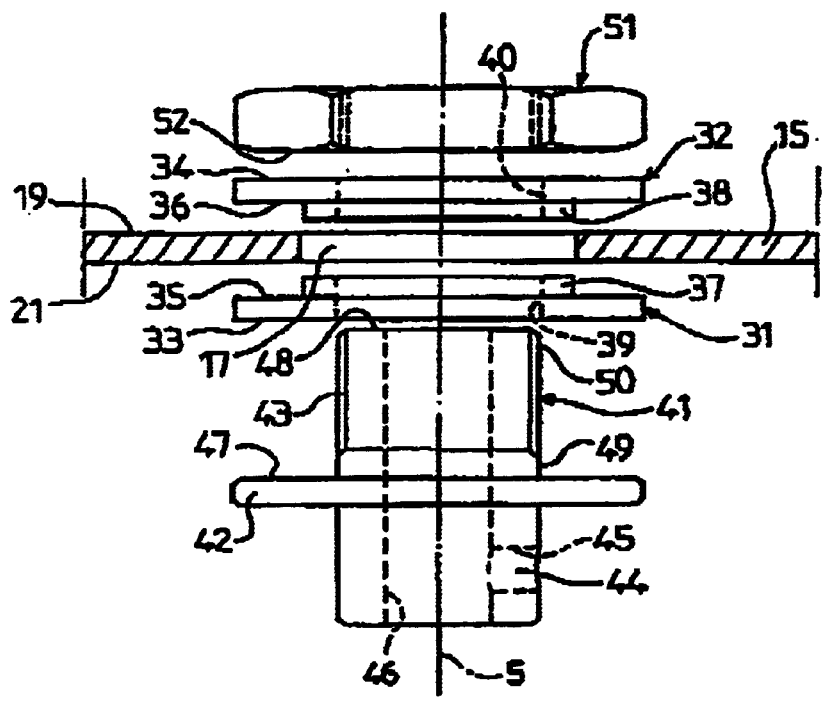
FIG. 4 is a partial exploded view corresponding to FIG. 3.

Accordingly, as shown in FIGS. 3 and 4, each retaining rod 41, is provided with a first energy absorbing capsule 31, of which a bearing face 33 is pressed against the bearing face 47 of the shoulder and another bearing face 35 is pressed against a lower face 21, 22 of the corresponding external flange 15, 16, the protuberance 37 of said capsule 31 engaging in the oblong hole 17, 18 in the external flange 15, 16. Each oblong hole 17, 18 has a cross section whose axis is the corresponding fixing axis 5, 6 of the energy absorbing capsules 31 and 32 and is slightly larger than axial protuberance 37 and 38.

In the same way, each retaining rod 41 is provided with a second energy absorbing capsule 32, a bearing face 36 of which is pressed against an upper face 19, 20 of the corresponding external flange 15, 16. The protuberance 38 of said capsule 32 engages in the oblong hole 17, 18 in the external flange 15, 16 and is slightly smaller than said oblong hole 17, 18. The axial protuberances 37 and 38 prevent metallic contact between the fixed parts and the mobile parts in the event of an impact.

The corresponding nut 51 screws onto the threaded end 43 of the corresponding retaining rod 41, pressing against the bearing face 34 of the second energy absorbing capsule 32. The clamping of the two energy absorbing capsules 31, 32 against the upper face 19, 20 and against the lower face 21, 22 of the corresponding external flange 15, 16 is adjusted by tightening the nut 51 to the required value, the retaining rod 41 being prevented from rotating by means of the handling hole 45. Each fixing bolt 53 with its shank 54 and its threaded part 57 then immobilizes this assembly on the fixed support member 8 and the structure of the vehicle 10. The bearing face 56 of the head 55 of the fixing bolt 53, which can be hexagonal, is pressed against the handling portion 44 via a conical washer 58, in order to retain a corresponding energy absorbing elastic helical spring 59 which is previously mounted on the circular cylindrical bearing surface constituting the periphery of said handling portion 44, in order to guide said helical spring 59.

The fixing bolt 53 is immobilized by the bearing face 48 of the threaded end 50 pressed against the lower face 24 of the fixed support member 8, whose upper face 23 is pressed against the structure 10 of the vehicle.

The fastening means are therefore independent of the corresponding fixing means, in order to adjust the clamping force of said fastening means to obtain the required energy absorption, i.e. so that the clamping of the energy absorbing capsules 31 and 32 can be adjusted independently of the clamping of said fixing means 53 of the support assembly 7 to the structure 10 of the vehicle.

The two capsules 31 and 32 disposed one on each side of the U-shaped lug of the mobile support member 9 have a rod 41 passed through them provided with a shoulder 42 whose outside diameter is substantially equal to the outside diameter of the capsules 31 and 32 and whose inside diameter is substantially equal to the inside diameter of the capsules 31 and 32.

The fine pitch thread 43 for adjusting the clamping of the nut 51 as a function of the required sliding force is aligned with the exterior diameter for centering said capsules 31 and 32.

The dimensions of each of the rods 41 mean that the steering column can be fixed to the vehicle by fixing bolts 53 passing through said rods 41 without affecting the previously set sliding force of the U-shaped lug.

In the embodiment shown in the figures, the fixing means, the energy absorbing capsules and the fastening means for said capsules are identical on each of the two fixing axes 5 and 6.

What we claim is:

1. An energy absorbing system for connecting a steering column of a vehicle to a vehicle chassis, comprising:
   (a) a support assembly (7) including fixed (8) and movable (9) components;
   (b) a plurality of fixing means (53) for clamping said support assembly with the vehicle chassis, each of said fixing means having a fixing axis (5, 6);
   (c) at least one energy absorbing capsule (31, 32) having a retaining axis that is coincident with a respective one of said fixing axes; and
   (d) fastening means (41, 51) clamping said energy absorbing capsule to said support assembly with an adjustable clamping force that is independent of the clamping operation of said fixing means relative to said support assembly.

2. An energy absorbing system as defined in claim 1, wherein two energy absorbing capsules (31,32) are associated with at least one of said fixing means (53).

3. An energy absorbing system as defined in claim 1, wherein said fastening means comprises:
   (1) a retaining rod (41) having a first end portion (44), an intermediate portion, and an externally threaded second end portion (50), said retaining rod containing a through bore and including on said intermediate portion a radially outwardly extending annular shoulder (42), said at least one energy absorbing capsule being annular and mounted concentrically on said retaining rod intermediate said threaded second end portion and said annular shoulder; and
   (2) a nut (51) threadably mounted on said threaded end portion to compress said at least one energy absorbing capsule with said clamping force against said annular shoulder;
and further wherein at least one of said fixing means includes:
   (1) a bolt (53) having an enlarged head portion (55) that cooperates with one end of said retaining rod, a shank portion that extends through said retaining rod through bore, and a threaded portion (54) that extends in threaded engagement with a threaded bore contained in the vehicle chassis.

4. An energy absorbing system as defined in claim 3, wherein said annular capsule has internal and outer diameters; and further wherein said retaining rod has an outer diameter that is slightly less than the internal diameter of said energy absorbing capsule, the outer diameter of said capsule being generally equal to the outer diameter of said retaining rod annular shoulder, said nut and said energy absorbing capsule having adjacent surfaces (52, 34) the areas of which are generally equal.

5. An energy absorbing system as defined in claim 4, wherein said retaining rod first end portion defines a handling portion (44) containing a radially inwardly directed handling hole (45).

6. An energy absorbing system as defined in claim 5, wherein said retaining rod handling portion includes a circular cylindrical bearing surface, and further including a helical energy absorbing spring (59) mounted concentrically about said retaining rod handling portion, said spring having a first end in engagement with said shoulder, and a second end that reacts with said bolt enlarged head portion.

7. An energy absorbing system as defined in claim 6, wherein said retaining rod, said shoulder and said handling portion constitute one and the same mechanical part.

8. An energy absorbing system as defined in claim 3, wherein said at least one energy absorbing capsule has an axial protuberance penetrating a corresponding hole in said support assembly to prevent metallic contact between said fixed and movable components of said assembly in the event of an impact.

9. An energy absorbing system as defined in claim 1, wherein at least one of said fixing means includes two energy absorbing capsules disposed against opposite faces of said support assembly movable component.

10. An energy absorbing system as defined in claim 9, wherein said steering column comprises a body tube (2), and a steering shaft (1) mounted in said body tube for rotation about a steering axis (3), said movable support assembly component including a pair of parallel spaced vertical uprights (11, 12) parallel with a vertical plane (4) containing said steering axis, said body tube being mounted between and parallel with said uprights, said movable support assembly component including a transverse connecting member (13), said support assembly movable component including a pair of external flange portions (15, 16) that extend outwardly of and normal to said uprights, each of said flange portions containing an oblong slot (17, 18) that extends parallel with said vertical plane, said fixing axes extending normal to said slots, respectively, said energy absorbing capsules having portions (37, 38) that extend axially into said slots, respectively, thereby to permit displacement of said movable assembly component relative to said fixed assembly component upon impact.

11. An energy absorbing system as defined in claim 10, wherein said external flange portions have first edge portions adjacent a steering wheel end of said steering shaft, said oblong slots (17, 18) being contained in said first edge portions, respectively.

12. An energy absorbing system as defined in claim 10, wherein said external flange portions are part of a common base member that is welded to said connecting member.

13. An energy absorbing system as defined in claim 1, wherein said fixing means of said support assembly includes fixing bolts.

14. An energy absorbing system as defined in claim 1, wherein each of said fixing means includes identical energy absorbing capsules (31, 32) and identical fastening means (51), respectively.

* * * * *